No. 876,538.
PATENTED JAN. 14, 1908.
J. H. GARDNER.
SEED PLANTER.
APPLICATION FILED MAR. 2, 1907.
2 SHEETS—SHEET 2.
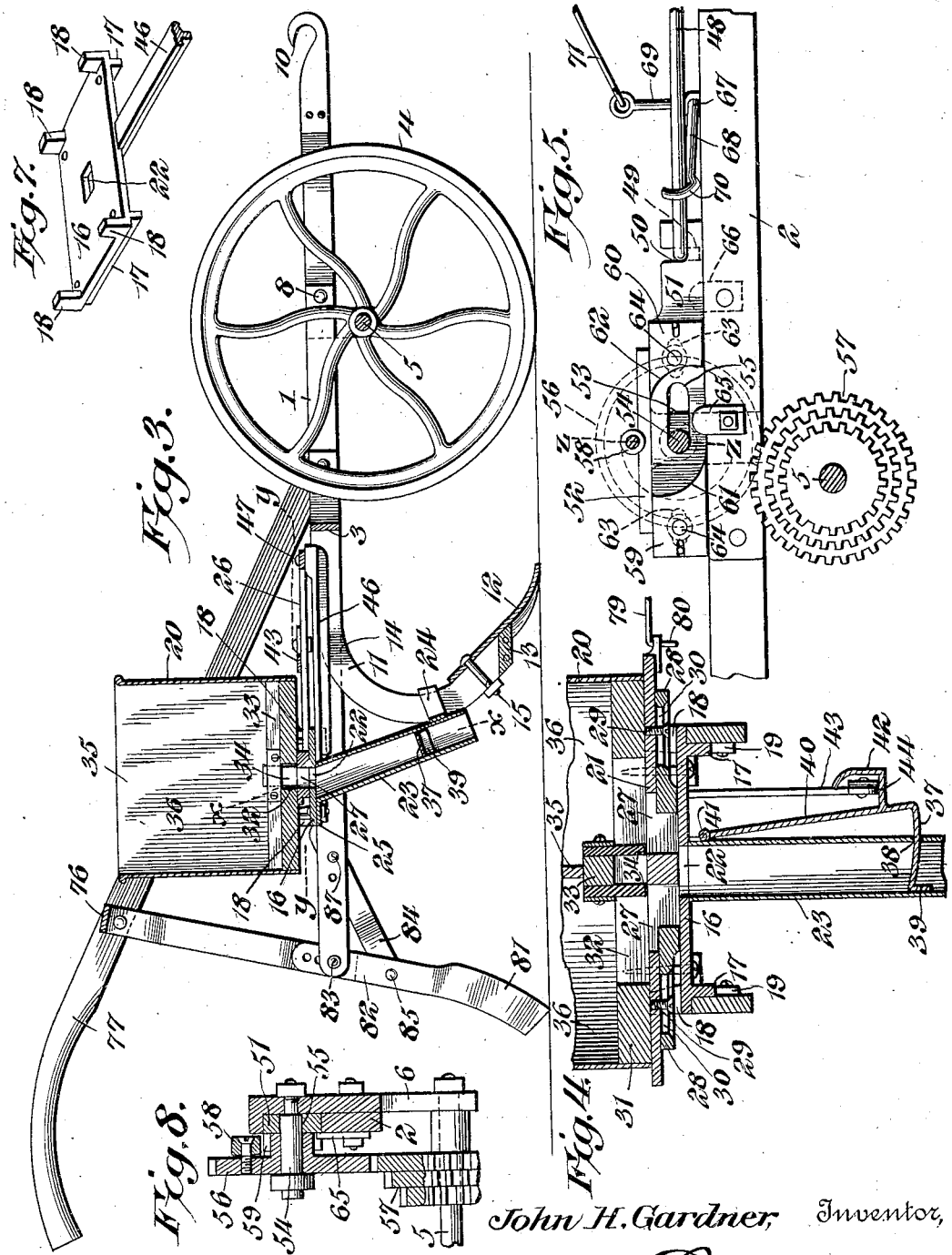
John H. Gardner, Inventor,
Witnesses
Howard D. Orr
J. T. Riley
By E. G. Siggers
Attorney

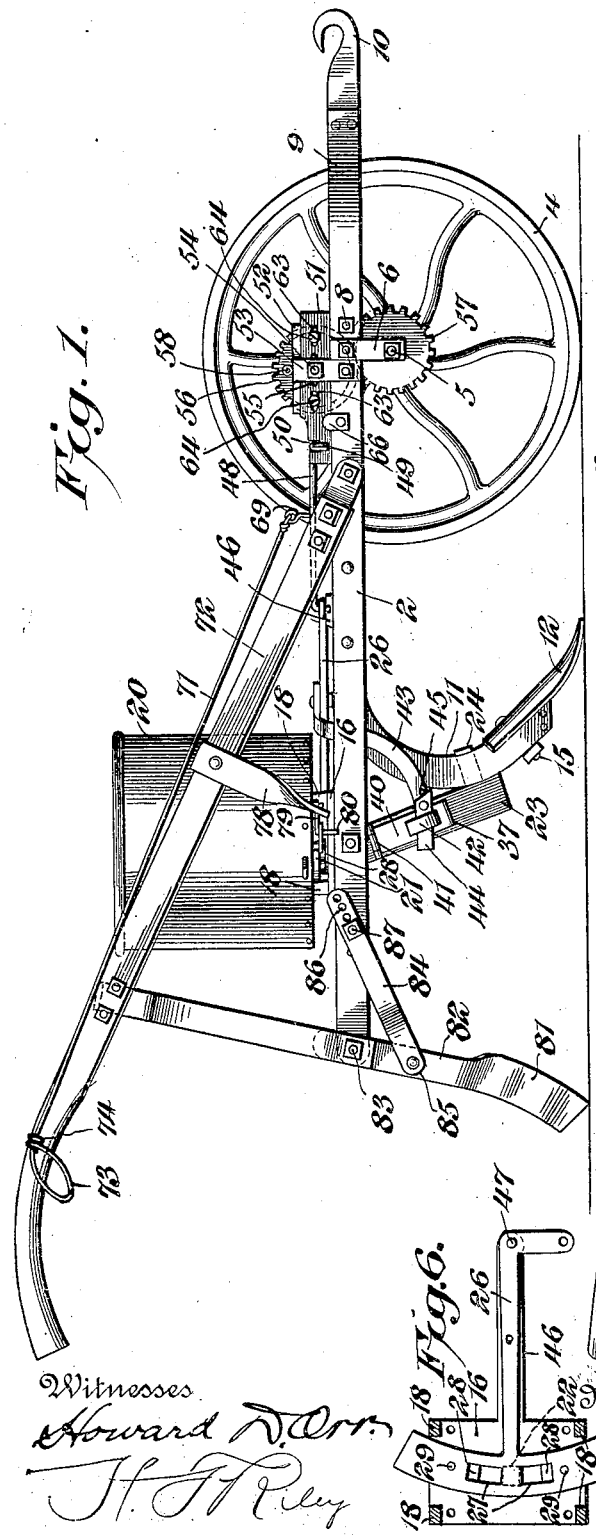
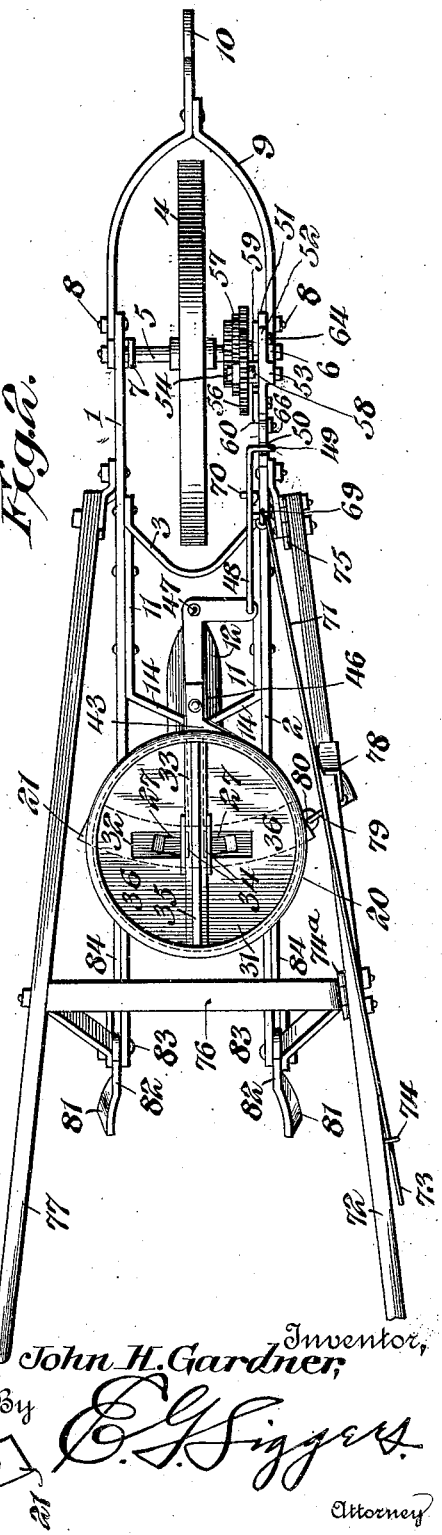

UNITED STATES PATENT OFFICE.

JOHN H. GARDNER, OF DALTON, GEORGIA.

SEED-PLANTER.

No. 876,538.　　Specification of Letters Patent.　　Patented Jan. 14, 1908.

Application filed March 2, 1907. Serial No. 360,161.

*To all whom it may concern:*

Be it known that I, JOHN H. GARDNER, a citizen of the United States, residing at Dalton, in the county of Whitfield and State of Georgia, have invented a new and useful Seed-Planter, of which the following is a specification.

The invention relates to improvements in seed planters.

The object of the present invention is to improve the construction of seed planters, and to provide a simple, inexpensive and efficient one, adapted to plant two kinds of seed, and capable of depositing the same in a furrow, either alternately, or simultaneously.

A further object of the invention is to provide a seed planter, adapted to drop the desired amount of seed the desired distance apart, and capable of both manual and automatic operation.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a seed planter, constructed in accordance with this invention. Fig. 2 is a plan view of the same. Fig. 3 is a central longitudinal sectional view. Fig. 4 is an enlarged transverse sectional view, taken substantially on the line $x$—$x$ of Fig. 3. Fig. 5 is an enlarged detail sectional view, illustrating the construction for actuating the reciprocating slide. Fig. 6 is a horizontal sectional view, taken substantially on the line $y$—$y$ of Fig. 3. Fig. 7 is a detail view of the supporting plate or member upon which the hopper is mounted. Fig. 8 is an enlarged detail sectional view, taken substantially on the line $z$—$z$ of Fig. 5.

Like numerals of reference designate corresponding parts in all the figures of the drawings.

The frame of the seed planter is provided with parallel side bars 1 and 2, which are connected by an intermediate cross bar 3, having its terminals bent at an angle and riveted, or otherwise secured to the inner face of the side bars 1 and 2. The cross bar 3 is also bowed rearwardly, being substantially V-shaped to clear a wheel 4, which supports the front of the seed planter, and which operates the seed dropping mechanism. The wheel is mounted on a transverse shaft or axle 5, which is journaled in suitable bearings of hangers 6, secured at their upper ends to the outer face of the side bars near the front ends thereof, and provided at their lower ends with bearing openings to receive the ends of the shaft or axle. The ends of the shaft or axle 5 are retained in the bearing openings of the lower upturned ends of the hangers by the body portions thereof.

The front ends of the side bars 1 and 2 extend beyond the hangers, and are perforated for the reception of bolts 8, which pivot a draft attachment 9 to the side bars. The draft attachment 9 consists of forwardly converging sides, which are slightly bowed, as shown, and which are secured together at their front ends, one of the sides being extended and shaped to form a clevis hook 10. The draft attachment may be adjusted to arrange it at the desired angle or inclination to suit the draft animal.

The sides 1 and 2 of the frame are also connected at an intermediate point by side bars or members 11 of a plow standard, which is curved, as shown, and which carries a furrow-opening blade 12. A spacing block or piece 13 is arranged between and secured to the lower ends of the side bars or members of the plow standard, and the upper ends of the side bars or members are spread and extended to form a pair of arms 14, which are riveted, or otherwise secured to the inner faces of the side bars of the main frame and which brace the same. The furrow-opening blade is adjustably secured to the lower portion or foot of the standard by means of a bolt 15, extending between the side bars or members and provided with a nut for engaging the rear edges of the same.

The side bars 1 and 2 are connected in rear of the plow standard by means of a supporting plate or member 16, provided at opposite sides with depending flanges 17, which are spaced from the side edges of the plate or member and which fit against the inner faces of the side bars 1 and 2. The side edges of the supporting plate or member extend beyond the depending side flanges and rest upon the upper edges of the side bars 1 and 2, as clearly illustrated in Fig. 4 of the drawings. The plate or member, which is provided at its upper face with projecting supporting lugs 18, is secured to the side bars 1 and 2 of the main frame by means of substantially L-shaped plates or knees 19, consisting of upper horizontal portions and lower vertical portions, the upper portions being riveted, or otherwise secured to the lower face of the supporting plate or member, and the vertical portion being bolted to the inner faces of the sides 1 and 2 of the frame.

The lugs 18 support and space the bottom of a hopper 20 from the upper face of the supporting plate or member, and they are located at opposite sides of the frame and are arranged at the front and rear portions of the supporting plate or member, the rear lugs being spaced from the front lugs to provide an intervening space for an arcuate seed slide 21. The hopper is secured by screens, or other suitable fastening devices to the bottom plate, and the latter is provided with a central opening 22, from which a seed spout 23 depends. The seed spout extends downwardly and forwardly at an inclination, and its lower end discharges in rear of the furrow-opening blade. The lower end of the seed spout is provided with forwardly projecting arms 24, which extend between the side bars or members of the plow standard and engage the front edges thereof. The front terminals of the arms 24 are bent laterally to engage the said plow standard, but any other suitable means may be employed for securing the lower end of the seed spout to the standard. The upper end of the seed spout is provided with a rearwardly projecting flange 25, which is bolted, or otherwise secured to the lower face of the supporting plate or member.

The arcuate seed slide, which is formed integral with and carried by a bell crank lever 26, is provided at opposite sides of its center with seed openings 27, and it has adjustable plates 28, secured by screws 29 to the lower face of the seed slide. The adjustable plates 28 have inner enlarged portions, and their outer portions are provided with longitudinal slots 30, to receive the screws.

The bottom 31 of the hopper 20 is provided with a transversely disposed slot or opening 32, and it has a longitudinally disposed bar or member 33, extending across the slot at the center thereof, and provided with depending plates or wings 34, which are located at opposite sides of the center of the hopper at a point directly above the opening of the supporting plate or member. The hopper is also provided with a centrally arranged partition 35, disposed in the plane of the median line of the machine and dividing the hopper into two separate compartments 36, adapted to contain two different kinds of seed, which may be, as hereinafter explained, planted either alternately or simultaneously. When the arcuate seed slide, which is oscillated by the bell crank lever 26, is at the limit of its movement in one direction, one of its openings is located at the center of the hopper at a point directly above the opening of the supporting plate or member and when the seed slide is moved in the opposite direction, the other opening is carried to the center of the hopper. The depending wings or plates operate as brushes or wipers, and are adapted to scrape off the superfluous seed from the seed slide, so that only the exact amount of seed contained within the opening will be delivered by the seed slide to the seed spout.

The seed spout is provided with a valve or cut-off 37, which is adapted to retain one charge of seed within the spout until the next succeeding charge is delivered to the same, whereby two different kinds of seed may be discharged simultaneously from the seed spout. The valve or cut-off 37, which is slightly curved, operates through a slot 38 in one side of the seed spout, and its inner end 39 is bent downwardly at an angle to form a stop for limiting the downward movement of the valve or cut-off. The valve or cut-off is provided with a stem 40, extending upwardly from the outer end of the cut-off or valve and connected at its inner terminal with the spout, near the upper end thereof by an exterior hinge 41. When the valve or cut-off is thrown out of operation, as hereinafter explained, the two kinds of seed contained within the compartments of the hopper will be alternately deposited in the furrow.

The stem of the valve or cut-off is provided with an outwardly projecting substantially L-shaped arm 42, having an upwardly projecting portion, arranged in spaced relation with the stem and adapted to be engaged by an arm 43 of the bell crank lever. The arm 43 of the bell crank lever operates in the space between the upwardly projecting portion of the arm 42 and the stem of the valve or cut-off, the loose motion being provided to permit the necessary movement of the seed slide. The bell crank lever 26, which is pivoted at its angle, consists of a short transversely disposed front arm and a long longitudinally disposed arm, and it is provided at a point intermediate of the ends of the long arm with the said arm 43. The arm 43, which is angularly bent, consists of an outwardly extending horizontal portion and a depending portion, which is curved rearwardly, as clearly illustrated in Fig. 1 of the drawings. The rearwardly curved portion is provided with a pivoted member or section 44, adapted to be swung into and out of engagement with the arm 42 of the valve or cut-off. The section or member 44 is pivoted near one end, and the arm 43 is provided with a stop 45, arranged to be engaged by the front end of the pivoted section or member 44 for limiting the downward swing of the other end, whereby the section or member is maintained in substantially a horizontal position, as illustrated in Fig. 1 of the drawings. The front end of the pivoted section or member is preferably beveled, and the rear end is adapted to be swung upwardly and forwardly to disengage it from the valve or cut-off of the seed spout.

The supporting plate or member is provided with a forwardly projecting supporting arm 46, reënforced at its lower face by a longitudinal rib and provided at its front end with an upwardly projecting pivot 47, which extends through a suitable opening of the bell crank lever 26. The short transversely disposed arm of the bell crank lever 26 is connected with the rear end of a longitudinally disposed connecting rod 48, provided at its rear end with a suitable pivot and having a substantially L-shaped arm 49 at its front end to engage a notch 50 of a reciprocating slide 51, which, when actuated, oscillates the bell crank lever. The slide 51 operates in a guide formed by a short guide bar 52, which is arranged in spaced relation with the side bar 2. The guide bar 52 is mounted on a bracket or plate 53, which extends upwardly from the side bar 2 and which also forms a support for a stub shaft 54. The stub shaft 54 extends through a slot 55 of the slide 51, and it receives a pinion 56. The slot, which also assists in guiding the reciprocating slide, has its end walls arranged to form stops for limiting the extreme movement of the slide. The pinion 56 meshes with a multiple gear 57, provided with a plurality of separate sets of teeth forming gears of different diameters, and by changing the pinion 56 and substituting therefore a pinion of a different diameter, the seed dropping operation may be varied. By means of the adjustment afforded by the gears, and by means of the adjustable plates of the seed slide, the desired amount of seed may be deposited in a furrow the desired distance apart.

The pinion, which may be detachably mounted on the stub shaft in any preferred manner, is provided with a wrist pin 58 carrying an anti-friction roller and adapted to actuate the slide 51. The slide 51 is provided at opposite sides of the stub shaft with adjustable plates 59 and 60, having curved inner faces 61 and 62, arranged to be engaged by the wrist pin, whereby the slide will be reciprocated. The wrist pin in its alternate engagement with the curved faces of the adjustable plates remains in contact with the same until the slide has reached the limit of its movement, and it is adapted to prevent any rebound of the slide, so that the accuracy and regularity of the seed dropping mechanism will not be affected by a rapid reciprocation of the slide. The adjustable plates 59 and 60, which are provided with longitudinal slots 63, are secured at the desired adjustment to the slide by means of screws 64 operating in the slots 63. The reciprocating slide is retained in the guide by means of a plate 65, secured to the inner face of the side bar 2 and located opposite the bracket 53, and a similar plate 66 is mounted on the side bar 2 for guiding the rear portion of the slide. The plates 65 and 66 extend above the upper edges of the said side bar 2, as clearly illustrated in Fig. 5 of the drawings.

When the seed planter moves forwardly, the wheel 4 will rotate and motion will be communicated through the gearing and the slide to the bell crank lever, which will oscillate and thereby carry the arcuate seed slide back and forth across the bottom of the hopper. The connecting rod 48 is adapted to be swung upwardly to disengage its front end from the notch 50 of the slide, and this operation is effected by means of a rock shaft 67, journaled in a suitable bearing of the frame of the seed planter and provided with inner and outer arms 68 and 69, arranged approximately at right angles to each other. The arm 68, which lies beneath the connecting rod, is provided with a curved terminal 70, disposed transversely of the connecting rod and arranged to lift the same out of the notch 50, when the arm 68 is swung upwardly. The arm 69 extends upwardly and is connected with the lower end of an inclined operating rod 71, mounted on an inclined handle 72 and terminating at its upper end in a loop or handle portion 73, which is located adjacent to the grip of the handle 72. The upper portion of the operating rod is arranged in a suitable guide 74, and the loop or handle 73 is adapted to be drawn rearwardly to rock the shaft 67, to disengage the connecting rod from the slide. When the connecting rod is disengaged from the reciprocating slide, the seed dropping mechanism is adapted to be operated by hand, and the seed planter may then be used for replanting. The handle 72, which is inclined, is laterally movable, and it is connected by upper and lower hinges 74ᵃ and 75 with the side bar 2 and with a brace 76. The brace 76, which is approximately inverted U-shaped, consists of a horizontal top portion and downwardly converging sides, which are arranged at an inclination and which are connected at their lower terminals with the rear ends of the side bars 1 and 2 of the frame. The movable handle 72, which is adapted to be rocked to oscillate the seed slide, is located at one side of the seed planter, and a fixed handle 77 is arranged at the opposite side thereof, being connected at its lower end with the side bar 1 and secured at an intermediate point to the brace 76. The movable handle is provided at an intermediate point with a depending arm 78, which is detachably connected by a link 79 with one end of the seed slide. The link 79, which is preferably hinged to the lower end of the arm 78, has its inner end bent downwardly to form a pivot 80, which detachably engages an eye or opening of the seed slide. The link enables the movable handle to be readily connected with the seed slide, and when the handle is rocked or oscillated laterally, the seed slide will be operated. This will enable the seed to be planted at will.

After the seed has been deposited in the furrow by the seed dropping mechanism, it is covered by means of a pair of covering blades 81, set at an angle and having shanks 82, pivoted to the rear ends of the side bars 1 and 2 by the bolts 83, which also secure the lower ends of the sides of the brace 76 to the frame. The shanks of the covering blades are also adjustably connected to the side bars by inclined braces or bars 84, pivoted at their lower ends 85 to the shanks 82 at points between the ends thereof and extending upwardly and forwardly to the said side bars 1 and 2. The front ends of the inclined bars or braces, are provided with perforations 86, arranged at intervals and adapted to receive bolts 87, or other suitable fastening devices for securing the covering blades in their adjustment.

Instead of using two different kinds of seed, the same kind of seed may be placed in each of the compartments of the hopper and the planter may also be employed for dropping fertilizer.

Having thus fully described my invention, what I claim as new and desire to secure by Letters Patent, is:—

1. In a machine of the class described, the combination of a hopper having separate compartments, a single seed spout arranged to receive seed from both of the said compartments, a seed slide provided with a plurality of openings arranged to alternately carry seed from the compartments of the hopper to the seed spout, and a valve or cut-off operating in the seed spout for retaining one charge of seed therein until the next charge is delivered to the spout.

2. In a machine of the class described, the combination of a hopper provided at its bottom with a slot, a partition dividing the hopper into separate compartments, spaced scrapers mounted at opposite sides of the partition and extending into the slot of the bottom, a seed spout located beneath the scrapers, and a seed slide provided wih a plurality of openings arranged to alternately carry seed from the compartments to the seed spout.

3. In a machine of the class described, the combination of a hopper provided in its bottom with a transverse slot, a partition dividing the hopper into separate compartments and extending across the slot, a seed spout located beneath the partition, a seed slide provided with a plurality of openings arranged to alternately carry seed from the compartments to the seed spout, adjustable plates carried by the seed slide for varying the size of the said openings, and spaced scraping devices mounted at opposite sides of the partition at points above the seed spout and extending into the slot.

4. In a machine of the class described, the combination of a frame having spaced side bars, a supporting plate mounted on the side bars and provided with depending flanges for engaging the same, said plate being also provided with upwardly projecting lugs, a hopper supported by the lugs and spaced from the said plate, a seed slide located between the bottom of the hopper and the supporting plate, and a seed spout secured to and depending from the supporting plate.

5. In a machine of the class described, the combination of a hopper provided in its bottom with a transverse slot, a bar extending across the slot, a partition located above the bar and dividing the hopper into separate compartments, a supporting plate located beneath the bar and having an opening, a seed spout extending from the opening, a seed slide having openings arranged to alternately carry the seed from the said compartments to the said spout, and plates or wings mounted on the said bar at opposite sides of the partition and depending therefrom to scrape the seed from the slide.

6. In a machine of the class described, the combination of a hopper, a seed spout, an oscillatory lever, an arcuate seed slide rigid with and carried by the lever, and means for operating the lever.

7. In a machine of the class described, the combination of a hopper having a plurality of compartments, a seed spout, an oscillatory lever, an arcuate seed slide rigid with and extending from opposite sides of the lever and provided with a plurality of openings arranged to alternately carry seed from the compartments of the hopper to the seed spout, and means for operating the lever.

8. In a machine of the class described, the combination of a hopper having a plurality of compartments, a seed spout, means for alternately carrying seed from the compartments of the hopper to the seed spout, and means for retaining seed in one of the compartments in the spout until the seed from the other compartment is delivered to the said spout.

9. In a machine of the class described, the combination of a hopper, a seed spout provided at one side with a slot, a seed slide, an oscillatory valve or cut-off mounted exteriorly of the spout and extending through the same and provided with interiorly arranged means for limiting its outward movement, and means for operating the seed slide and the valve or cut-off.

10. In a machine of the class described, the combination of a hopper, a seed spout provided at one side with a slot, a seed slide, an oscillatory valve or cut-off mounted exteriorly of the spout and extending through the said slot and having its inner end bent at an angle to provide a stop for engaging the interior of the spout to limit the outward movement of the valve or cut-off, and means for operating the seed slide of the valve or cut-off.

11. In a machine of the class described, the combination of a hopper, a seed spout having a slot, a seed slide, a valve consisting of a curved portion operating through the slot of the spout and provided at its inner end with a stop arranged to engage the spout to limit the outward movement of the valve, and a stem extending from the curved portion and hinged exteriorly of the spout, and means for operating the seed slide and the valve.

12. In a machine of the class described, the combination of a hopper, a seed spout having a valve, an oscillatory lever having an integral seed slide, and means for connecting the valve with the lever.

13. In a machine of the class described, the combination with a hopper, and a seed spout, of a lever provided with an arm and having a seed slide rigid with and carried by the lever, a valve or cut-off operating in the seed spout, and means for connecting the valve or cut-off with the arm of the lever.

14. In a machine of the class described, the combination with a hopper, and a seed spout, of an oscillatory lever, a seed slide rigid with and carried by the lever, a valve or cut-off for the seed spout, and an arm extending from the lever and provided with means for connecting it with and disconnecting it from the valve or cut-off.

15. In a machine of the class described, the combination with a hopper, and a seed spout, of a lever having a seed slide, a valve or cut-off for the seed spout provided with an arm having its outer portion arranged in spaced relation with the valve or cut-off, and an arm extending from the lever and operating in the space between the outer portion of the arm of the valve or cut-off and the latter.

16. In a machine of the class described, the combination with a hopper, and a seed spout, of a lever having a seed slide, a valve or cut-off for the seed spout provided with an arm having its outer portion arranged in spaced relation with the valve or cut-off, and an arm extending from the lever and provided with a pivoted member arranged between the valve or cut-off and the outer portion of the arm thereof and adapted to swing out of engagement with the same.

17. In a machine of the class described, the combination with a hopper, and a seed spout, of a lever having a seed slide, a valve or cut-off for the seed spout provided with an arm having its outer portion arranged in spaced relation with the valve or cut-off, an arm extending from the lever and provided with a stop, and a pivoted member mounted on the arm of the lever and forming a continuation of the same and normally engaging the stop, said member being arranged between the valve or cut-off and the arm thereof.

18. In a machine of the class described, the combination of a frame having spaced side bars, a supporting plate mounted on the side bars and provided with a projecting arm, a hopper located above the supporting plate, a lever fulcrumed on the arm of the supporting plate and provided with a seed slide, a seed spout having a valve or cut-off, and means for connecting the valve or cut-off with the lever.

19. In a machine of the class described, the combination with a hopper, and a seed spout, of a pivoted lever, a seed slide rigidly connected with the lever at a point beyond the pivot thereof, a reciprocatory slide connected with the lever, and gearing having a crank element for actuating the reciprocatory slide.

20. In a machine of the class described, the combination with a hopper, of a horizontally disposed bell crank lever provided at one of its arms with a seed slide, a reciprocatory slide connected with the other arm of the lever, and a gearing having a crank element for actuating the reciprocatory slide.

21. In a machine of the class described, the combination with a hopper, of a seed slide, a reciprocatory slide provided with adjustable plates having eccentrically arranged faces, and gearing having a crank element arranged to engage the adjustable plates.

22. In a machine of the class described, the combination with a frame, and a hopper, of a wheel supporting the frame, a gear connected with the wheel, a shaft mounted on the frame, a reciprocatory slide mounted on the frame and provided with a slot receiving the said shaft, a pinion mounted on the shaft and meshing with the gear and provided with a wrist pin, adjustable plates mounted on the reciprocatory slide and arranged to be engaged by the wrist pin, and a seed slide connected with and operating in the reciprocatory slide.

23. In a machine of the class described, the combination with a hopper, and a seed slide, of a reciprocatory slide, means for communicating motion from the reciprocatory slide to the seed slide, said means embodying a connecting rod detachably engaging the reciprocatory slide, operating mechanism for moving the connecting rod into and out of engagement with the reciprocatory slide, and gearing for actuating the latter.

24. In a machine of the class described, the combination with a hopper, of a lever having a seed slide, of a reciprocatory slide, a connecting rod extending from the lever to the reciprocatory slide and detachably engaging one of the said parts, and operating mechanism for moving the connecting rod into and out of engagement with such part.

25. In a machine of the class described, the combination with a hopper, of a lever provided with a seed slide, a reciprocatory slide having notches, a connecting rod extending from the lever and provided with an arm detachably engaging the notch of the reciprocatory slide, and operating mechanism for moving the connecting rod into and out of engagement with the said notch.

26. In a machine of the class described, the combination with a hopper, of a lever having a seed slide, a reciprocatory slide, a connecting rod extending from the lever to the reciprocatory slide and detachably engaging the latter, a rock shaft having an arm arranged to lift the connecting rod out of engagement with the reciprocatory slide, and an operating rod connected with the rock shaft for actuating the same.

27. In a machine of the class described, the combination with a frame having handles, and a hopper, of a seed slide, means for actuating the same, said means embodying a connecting rod, a rock shaft having an arm arranged to throw the connecting rod into and out of operation, and an operating rod extending along one of the handles and connected with and adapted to actuate the rock shaft.

28. In a machine of the class described, the combination of a frame having inclined handles, a hopper, a wheel supporting the frame, a horizontally movable lever having a seed slide, a reciprocatory slide, a connecting rod extending from the lever and detachably engaging the reciprocatory slide, means for communicating motion from the wheel to the reciprocatory slide, a rock shaft having an arm arranged to lift the lever out of engagement with the reciprocatory slide, and an operating rod connected with the rock shaft and extending along one of the handles.

29. In a machine of the class described, the combination of a frame, a seed hopper, seeding mechanism, wheel operated mechanism adapted to be connected with the seeding mechanism, handle operated means adapted to be connected with the seeding mechanism, means on the handle operated means for connecting and disconnecting the wheel operated mechanism and the seeding mechanism, and means for connecting and disconnecting the handle operated mechanism and the seeding mechanism.

30. In a machine of the class described, the combination of a frame having inclined handles, one of the handles being movable, a seed hopper, seeding mechanism, wheel operated mechanism adapted to be connected with the seeding mechanism, means on the movable handle for connecting and disconnecting the wheel operated mechanism and the seeding mechanism, and means for connecting and disconnecting the movable handle and the seeding mechanism.

In testimony, that I claim the foregoing as my own, I have hereto affixed my signature in the presence of two witnesses.

JOHN H. GARDNER.

Witnesses:
  J. E. SATTERFIELD,
  A. C. HUFF.